Oct. 1, 1935.      J. D. RYDER      2,015,967

MOTOR CONTROL CIRCUIT

Filed April 14, 1932

INVENTOR
John D. Ryder.
BY
Raymond W. Junkins
ATTORNEY

Patented Oct. 1, 1935

2,015,967

UNITED STATES PATENT OFFICE 2,015,967

MOTOR CONTROL CIRCUIT

John D. Ryder, Cleveland, Ohio, assignor to Bailey Meter Company, a corporation of Delaware Application April 14, 1932, Serial No. 605,267

11 Claims. (Cl. 172—239)

My invention relates to motor control circuits and to apparatus utilizing such circuits for effecting an indication and/or control of the magnitude of a variable quantity, condition, relation, etc., such, for example, as pressure, temperature, flow or any physical, chemical, thermal, electrical, hydraulic or other variable.

According to my invention the deflections of a Bourdon tube, galvanometer or other device sensitive to the instantaneous magnitude of a variable may be utilized to control an electric circuit, and by suitable electrical means hereinafter described, the power of the device may be amplified for controlling the operation of a motor or electrical device to effect an indication and/or control.

In carrying out my invention in preferred form, I control the starting, stopping and speed of alternating current motors and through the agency of certain electron discharge devices handle only a minute current with the variable-sensitive device, to control the relatively greater motor current.

Further features of my invention will become apparent from the following description and from the drawing, in which.

Figure 1:
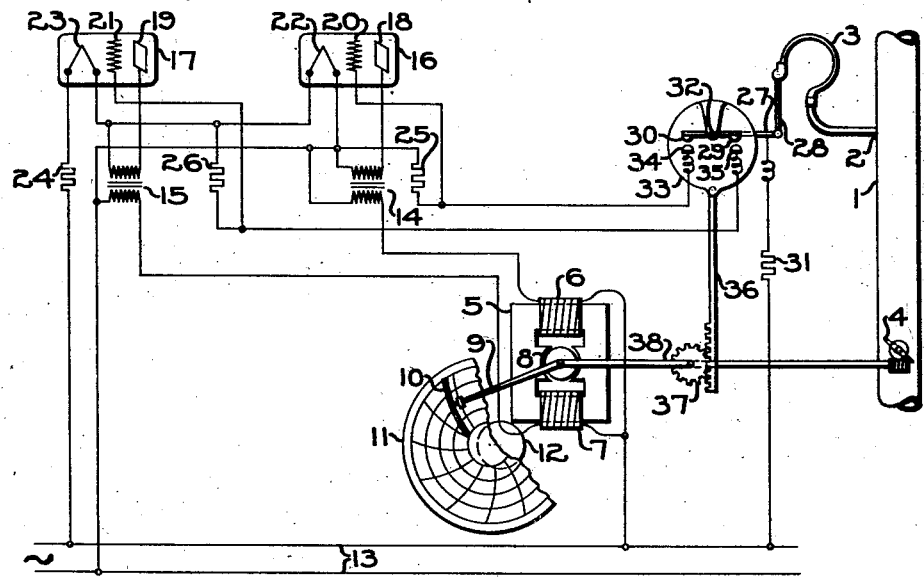
Fig. 1 represents a somewhat diagrammatic showing of one embodiment of my invention for indicating and controlling the value of fluid pressure.

Referring first to Fig. 1, I have therein illustrated an embodiment of the invention whereby the control of a variable such, for example, as the pressure of a fluid in the conduit 1, to which is responsive a Bourdon tube 3 at the point 2, is effected through the positioning in the conduit of a valve or damper 4. For positioning the damper I provide a normally stationary self-starting synchronous motor 5 having opposed field windings 6 and 7 connected in an alternating current circuit. Energization of the field 6 alone will effect rotation of the rotor 8 in one direction, whereas energization of the field 7 alone will effect rotation of the rotor 8 in the opposite direction. Equal simultaneous energization of the two fields will impress upon the rotor equal opposing torques effectively cancelling each other, whereby the rotor is not urged to rotation in either direction. If one field has been energized, with the rotor rotating in corresponding direction, the torque of rotation is the torque of the energized field minus the torque of counter-E. M. F. If then the other field is energized, thereby applying to the rotor substantially instantaneously a torque tending to cause rotation in the opposite direction, the stopping torque comprising this latter rotating torque plus the counter-E. M. F. preponderates the rotating torque, and plugging or substantially instantaneous stoppage of rotation of the rotor results, whereafter continued equal simultaneous energization of the two fields cancel out.

The motor 5 is adapted, as will be explained, to position the damper 4 within the conduit 1 responsive to the value of fluid pressure to which the Bourdon tube 3 is sensitive, and is further adapted to simultaneously position an indicator 9 comprising a marking means, relative to an index 10 and to a recording chart 11, the latter driven at a uniform speed by a clock motor 12 in common manner. The arrangement providing not only a control of the damper 4, but an indicating and recording of the instantaneous value of fluid pressure.

A feature of my invention resides in novel means I have devised to automatically control the energization of the motor windings 6 and 7 responsive to variations in pressure of the fluid. The current necessary to energize such motor windings is large relative to that which it is desirable to handle by contacts which may be moved or positioned by the relatively small power of a Bourdon tube or in other embodiments by a galvanometer or similar sensitive device. It has in the past been customary to either attempt to handle the motor current directly through positioning of the Bourdon tube, with resulting burning, arcing, etc. of contacts, or through numerous relays and amplifying means. By my invention I am able to control the energization of the motor windings without the heretofore necessary contacts in the motor circuits and to utilize such an extremely small current to perform that function that deterioration of the contact members where used is entirely avoided.

In general, I connect the motor winding 6 in series with the primary of a transformer 14 and the motor winding 7 in series with the primary of a transformer 15, each separately and directly across a source of alternating current 13. As is well known, the impedance of the primary winding of a transformer varies inversely as the current in the secondary winding. Thus by proper circuit design: with the secondaries of the transformers 14 and 15 open-circuited, and notwithstanding that the motor windings 6 and 7 are connected directly to a suitable source of electrical energy, sufficient current will not pass through the primary windings of the transformers, due to their high impedance, to appreciably energize the windings 6 and 7. If, however, the secondary windings of the transformers are close-circuited, the impedance of the primary windings will be reduced to such an extent that the motor windings will be substantially normally energized. By arranging the circuit so that both motor windings 6 and 7 will be energized to the same extent, it is apparent that with the secondary windings of the transformers 14 and 15 both close-circuited, the torques impressed upon the rotor 8 from the field windings 6 and 7 will be equal and opposite, and cancel out.

Under such design conditions and arrangement, if the secondary of one of the transformers is open-circuited, the result will be a rotation of the rotor 8 in desired direction; whereas if the secondary of the other transformer is open-circuited, the rotor will rotate in the opposite direction. It will further be seen that through proper design of the transformers, the current in the secondary when close-circuited can be made to be in relatively small proportion to that necessary for normal energization of the motor windings, whereby the contacts for handling such current for closing and opening the secondary circuit may be appreciably lighter and more delicate than if the contacts were handling directly the current for energization of the motor windings.

In my improved control circuit I employ suitable electron discharge devices 16, 17 wherein I establish or rupture the flow of current through the secondaries of the transformers 14, 15 to vary the impedance of the primaries of the transformers. The electron discharge devices or thermionic valves 16, 17 have anodes 18, 19, grids 20, 21, and cathodes 22, 23 respectively. With the cathode negative relative to the anode, current will flow from the anode to the cathode so long as the grid is sufficiently positive. If, however, the potential relation between the anode and cathode is sufficiently changed through the grid becoming sufficiently negative, then the flow of current will cease. Thus the flow of current through the device is effectively established or ruptured through a varying of the potential of the grid.

The cathodes 22, 23 may be suitably heated by connecting them in series with a resistance 24 across the alternating current source 13. The secondary winding of the transformer 14 connected to the anode 18 and the cathode 22 of the thermionic device 16 forms the output circuit energization for the device 16. Similarly, the secondary winding of the transformer 15 is connected to the anode 19 and the cathode 23 forming the output circuit of the device 17. A normal potential relation is maintained between the grid 20 and the cathode 22 by a suitable impedance device herein shown as a resistance 25, while a similar resistance 26 serves to maintain a normal potential relation between the grid 21 and the cathode 23.

The thermionic devices 16, 17 are uni-directional in that current passes only from the anode to the cathode when the device is conducting, and that if alternating current is applied across the device then only half of the wave passes through the device, namely, when the anode is positive relative to the cathode, resulting in a flow of pulsating direct current comprising the half-wave of the alternating current uni-directional through the thermionic device.

Whenever the anodes 18, 19 bear a positive potential in respect to the potential of their cathodes 22, 23, the normal potential of the grids 20, 21 will permit passage of current through the output circuit of the devices 16, 17. That is, the potential of the grids 20, 21 will not be sufficiently negative to prohibit passage of current through the device.

It is therefore evident that during that portion of each cycle of alternating current supplied to the output circuit when the anodes 18, 19 bear this relation to their respective cathodes, a pulsating direct current will pass through the output circuits of the two devices. During the alternate portion of each cycle of the alternating current wave, however, when the potential of the anodes 18, 19 is negative with respect to the potential of the cathodes 22, 23, the devices will be non-conducting and the output circuit will in effect be open-circuited. However, I have found that the pulsating direct current passing through the output circuits of the devices will be of sufficient magnitude to reduce the impedance of the primary windings of the transformers 14 and 15 so that the motor windings 6 and 7 will be energized a substantially normal amount whenever the normal potential relation between the grid 20 and cathode 22 as well as between the grid 21 and cathode 23 is maintained.

I desirably, then, normally have the rotor 8 stationary through the application thereto of equal opposing torques of the strong fields 6, 7 with devices 16, 17 passing current to cause a lowering of primary impedance of the transformers 14, 15. When I desire the rotor 8 to rotate in one direction or the other, I make one of the fields 6, 7 relatively weak through increasing the impedance of the primary of the related transformer by making non-conducting the electron discharge device in the secondary circuit of that transformer. I might equally as well normally have the fields 6, 7 relatively weak and cause rotation of the rotor 8 by strengthening one of the fields; however, I have illustrated only the former arrangement.

In general, I arrange that movements of the Bourdon tube 3 positioned sensitive to fluid pressure within the conduit I will cause an establishing or discontinuing of current passage through the devices 16, 17 for control of the motor 5; of the device 16 or the device 17, depending upon the desired direction of rotation of the rotor 8. Upon a change in pressure of the fluid within the conduit I effect an angular displacement of the rotor 8 proportional to the magnitude of the change in pressure, to the end that the damper 4 may be positioned within the conduit and the indicator 9 moved relative to the index 10 and the chart 11 in desired proportionality. I provide means whereby the movements of the Bourdon tube are effective for changing the normal potential relation between the grids and cathodes of the thermionic discharge devices 16, 17 for causing such desirable control of the motor 5.

In Fig. 1 I show a beam 27 articulated to the Bourdon tube through the mediary of a connecting rod 28. The beam 27 carries one-half each of normally open-circuited contacts 29, 30 electrically connected to one side of the alternating current power source 13 through a suitable resistance 31. The beam 27 is adapted to be angularly positioned around a pivot 32 fixed to a contactor case 33 which carries the mating portions 34, 35 of the beforementioned contacts.

When through movement of the Bourdon tube 3 the contact beam 27 is positioned angularly around the pivot 32, then either the contact 30—34 or the contact 29—35 is close-circuited.

The contact 34 is connected between the grid 20 and the resistance 25, while the contact 35 is connected between the grid 21 and the resistance 26. With the contacts 30—34 and 29—35 normally open-circuited, the resistances 25 and 26 respectively are in the circuit of the grids 20, 21. If the contact beam 27 is rotated in a counter-clockwise direction around its pivot 32 and the contact 30—34 close-circuited, then the grid 20 is connected directly through the resistance 31 to the power source 13 rather than through the resistance 25. Similarly, should the beam 27 be positioned in a clockwise direction around its pivot, the contact 29—35 being close-circuited, connects the grid 21 directly to the power source through the resistance 31 rather than through the resistance 26. The relative values of the circuits is such that by so connecting the grids 20 or 21 through the resistance 31, the normal potential of the grid with respect to its related cathode is varied, whereby the thermionic device is made non-conducting. Thus with the arrangement illustrated, a close-circuiting of the contacts 30—34 will result in the device 16 ceasing to pass current; whereas if the contact 29—35 is close-circuited, the device 17 will cease to pass current. Correspondingly, the field 6 or the field 7 will be weakened through the increase of impedance in the primary of the related transformer.

I show the contactor case 33 as carried by, and possible of vertical positioning, a rack 36 driven through the gearing 37 by the shaft 38 of the rotor 8 so that when the motor 5 is energized for rotation in one direction or the other, its movement and that of its related shaft 38 will cause a follow-up action of the contactor 33 whereby the contacts 30—34 or 29—35, whichever had been close-circuited, will be open-circuited to cause a cessation of movement of the rotor 8.

In operation, under normal conditions, when the pressure of the fluid within the conduit is stable, the beam 27 will be in a horizontal position and the contacts 30, 29 will be disengaged from their mating contacts 34, 35. Under this condition the normal potential relation between the grids 20, 21 and their respective cathodes 22, 23 as determined by the resistances 25, 26 will allow pulsating direct current to pass through the output circuits of the thermionic discharge devices 16, 17 for a portion of each cycle of the alternating current wave. This current will serve to reduce the impedance of the primary windings of the transformers 14, 15 to the end that the motor windings 6 and 7 will be energized a substantially normal amount and exert equal and opposite torques on the rotor 8 whereby the motor will not tend to rotate.

Upon, for example, an increase in pressure of the fluid within the conduit, the beam 27 will be angularly displaced about the pivot 32 in a counterclockwise direction an amount proportional to the magnitude of the increase in pressure. The contact 30 will engage the contact 34, destroying the normal potential relation between the grid 20 and the cathode 22 of the device 16, and substituting therefor a potential relation such that the device 16 will remain non-conducting during all portions of each alternating current cycle, or in effect open-circuiting the secondary winding of the transformer 14. This will serve to increase the impedance of the primary winding of the transformer 14 sufficiently so that the motor winding 6 will be substantially de-energized for the period of engagement between the contact 30 and the contact 34. Under this condition, as the motor winding 7 remains normally fully energized, the rotor 8 will move in a direction arranged to close the damper 4 within the conduit, whereby the pressure at the point 2 is decreased and simultaneously to move the indicator 9 relative to the index 10 and the recording chart 11.

The pinion 37 revolving with the shaft 38 of the rotor 8 will carry the contactor 33 upward to reposition the beam 27 in horizontal plane, and with the contact 30 disengaged from the contact 34, resulting in a return of the device 16 to conducting condition, whereby equal energization of the motor windings 6 and 7 will occur and rotation of the rotor 8 will be stopped.

It is evident that the angular displacement of the rotor 8 necessary to reposition the beam 27 to a horizontal position will be directly proportional to the movement of the Bourdon tube 3 which in turn is proportional to the variation in pressure within the conduit. It is therefore further evident that movement of the indicator 9 will bear a direct relation to variations of the pressure of the fluid within the conduit and will in cooperation with a suitable graduated index 10 and recording chart 11 give an indication and record respectively of the pressure of the fluid within the conduit.

Figure 2:
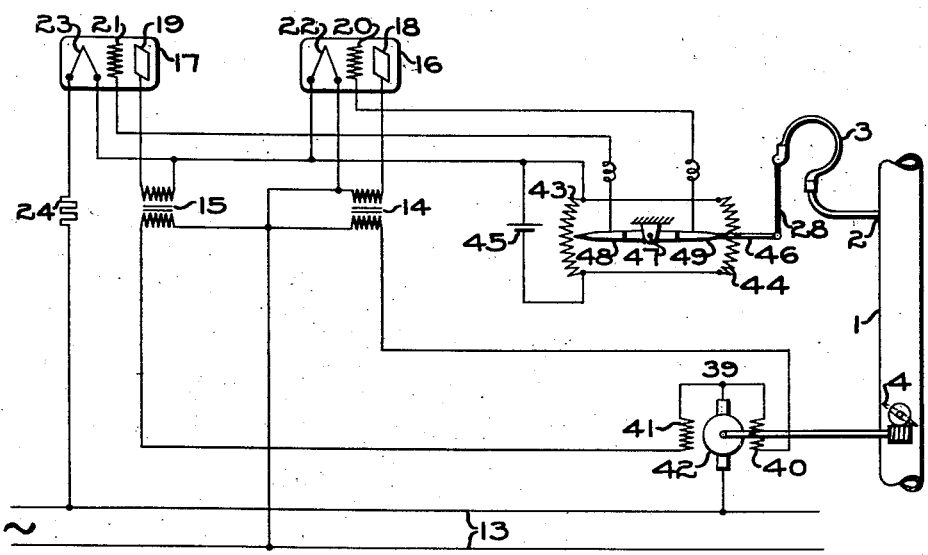
Fig. 2 is a similar diagrammatic arrangement of a further embodiment of the invention.

In Fig. 2 I have shown a modification or further embodiment of my invention wherein the speed of a motor controlling the operation of a damper or valve means may be made proportional to the amount of deviation of the condition, such, for example, as the pressure within the conduit from a desired value, through varying the current in the output circuit of the electron discharge devices in accordance with the magnitude of the pressure. As is well known, the passage of current through the output circuit may be regulated by varying or controlling the grid potential.

I show a normally stationary reversible variable speed alternating current motor 39 adapted to position the damper 4 within the conduit 1 at a rate of speed proportional to the variation of the pressure within the conduit at a point 2, from a predetermined value. The motor 39 is provided with opposed fields 40, 41 and has a wound armature 42. The field 40 is connected in series with the primary of the transformer 14 across the source 13 through the armature 42. Similarly the field 41 is connected in series with the primary of the transformer 15 across the source 13 through the armature 42. The characteristics of such a motor are that with equal energization of the fields 40, 41 the motor will not be urged to rotation in either direction, for the opposed fields of equal strength will tend to cancel out so far as applied torque is concerned. If, however, the energization of one field is greater in amount than that of the other field, then the rotor will be caused to rotate in one direction and at a speed proportional to the difference in energization.

As a means of varying the relative energization of the fields 40, 41 I vary the impedance of the primaries of the transformers 14, 15 by regulating the current in the output circuit of the devices 16, 17 which I preferably accomplish by varying the potential relation between the grids 20, 21 relative to their respective cathodes 22, 23 in accordance with the magnitude of the pressure within the conduit 1.

To provide the grids 20, 21 with potentials of variable magnitude with respect to the potentials of the cathodes I show resistances 43, 44 connected in parallel with each other and to the cathodes 22, 23. To effect a fall of potential through the resistances a suitable source of current such as a battery generally indicated at 45 may be used. It is evident that at the end of the resistances connected with the positive terminal of the battery 45 a potential substantially equal to that of the cathodes 22, 23 will exist, while at the ends of the resistances connected to the negative terminal of the battery 45 a potential substantially equal to that of the cathodes less the potential difference created by the source 45 will exist. By proper selection of the source 45 I may obtain a potential at the end of the resistances connected with the negative terminal that when applied to the grids 20, 21 will render the respective devices 16, 17 non-conductive; or I may select a source 45 to obtain any desired minimum value of current in the output circuits of the devices 16, 17.

In order that the potential drop between the grids and their related cathodes may be directly proportional to the magnitude of the pressure within the conduit 1, I provide a beam 46 oscillatable about a fixed pivot 47 and carrying contact arms 48, 49 insulated from each other and from the beam 46 and adapted to slidably engage along the resistances 43, 44 respectively. The beam 46 is pivotally secured to the Bourdon tube 3 through a connecting link 28 and will be positioned about its pivot 47 in accordance with variations in magnitude of the pressure within the conduit 1 through movement of the Bourdon tube 3.

The potential relation between the respective grids and cathodes of the devices 16 and 17 may be varied through variations in that part of the resistances 43, 44 in circuit between the grids and cathodes dependent upon the angular position of the beam 46 around its pivot 47. When, as shown, beam 46 is in a horizontal position, indicating that the pressure within the conduit 1 is at a desired value, the potential difference existing between the grid 20 and its related cathode 22 will be equal to the potential difference between the grid 21 and its related cathode 23. While this condition persists during that portion of the alternating current cycle when the anodes 18 and 19 have a positive potential in comparison to the potential of their respective cathodes, equal currents will flow through the output circuits of the two devices 16, 17 effecting equal energization of the fields 40, 41 so that the motor 39 will not tend to rotate and the damper 4 will be held stationary.

When, however, there is an increase in pressure, for example, within the conduit 1 above the predetermined desirable value, the beam 46 will tend to rotate in a counterclockwise direction about its pivot 47 an amount proportional to the increase in pressure. The difference in potential between the grid 20 and its related cathode 22 will decrease an amount proportional to the increase in pressure, whereas the difference in potential between the grid 21 and the cathode 23 will increase in proportion thereto. While this condition persists, due to the characteristics of the devices 16, 17 as hereinbefore stated, it is apparent that the ratio of the currents in the output circuits of the devices 16, 17 will be proportional to the position of the beam 46 whereby the greater the counterclockwise angular displacement of the beam from a horizontal position, the greater will be the current in the output circuit of the device 16 compared with the current in the output circuit of the device 17.

Inasmuch as the impedance of the primaries of the transformers 14, 15 bears a functional relation to the current in the secondaries, it is evident that angular displacement of the beam 46 in a counterclockwise direction will result in greater energization of the field 40 and a lesser energization of the field 41. Through such unbalancing of the fields 40, 41 a rotation is effected of the armature 42 in proper direction and at a speed proportional to the difference in energization whereby the damper 4 will be moved at a speed bearing a functional relation to the increase of pressure within the conduit 1 above the desired value. Such change in angular positioning of the damper 4 will tend to return the pressure within the conduit to predetermined value whereby the beam 46 will return toward its original horizontal position and through such equalization of the fields 40, 41 rotation of the armature 42 will cease.

Similarly, upon a decrease in pressure the current in the output circuit of the device 17 will be increased an amount proportional to the decrease in pressure, whereas the current in the output circuit of the device 16 will be decreased an amount proportional to the decrease in pressure due to the clockwise displacement of the beam 46 resulting in an opening of the damper 4 an amount and at a speed proportional to the deviation in pressure from the desired value.

While I have shown the resistances 43, 44 uniform throughout their entire length, resulting in the difference in potential existing between the grids and their respective cathodes being in direct proportion to the angular displacement of the beam 46 from a given position, it will be evident that I might, by increasing or decreasing the amount of resistance per unit length of the resistances, obtain any desired functional relation between grid and cathode potential difference and angular displacement of the beam 46, whereby any desired functional relation might be obtained between the speed of the damper 4 and the variation in magnitude of the pressure within the conduit from a predetermined value.

It is also to be understood that while I usually prefer to arrange the battery source 45 so that the highest potential impressed on the grid is substantially equal to the cathode potential, inasmuch as in this way I am able to have a minimum grid potential sufficient to render the electron discharge devices 16, 17 non-conducting, I may by reversing the terminals of the source 45 have the minimum grid potential equal to the cathode potential as determined by the source, or I may by proper connections between the cathodes and resistances have the grid potential increase and decrease from the cathode potential any desired amount.

Although I have chosen to describe and illustrate my invention in connection with a pressure control system for controlling the pressure of a fluid within a conduit, it is obvious that it is applicable to other types of pressure control systems employed for other uses, or that further, it is not limited to use in connection with pressure control systems, but may be used in the control of any variable or relation of variables which may or may not be the same variables as to which the relatively weaker sensitive device is responsive. I have broadly an improved electrical control circuit for an alternating current motor whereby the motor may be started, stopped, or its speed varied while running, responsive to the magnitude of a variable and for the control of variables. I accomplish such motor control through the agency of amplifying means such as electron discharge devices for varying the impedance of the primaries of transformers connected in the field windings of the motors.

Having thus described and illustrated a preferred embodiment of my invention, I desire it to be distinctly understood that I am to be limited thereby only as to the claims in view of prior art.

What I claim as new, and desire to secure by Letters Patent of the United States, is:—

1. In combination with apparatus having a factor which during operation of the apparatus tends to vary from a predetermined value and electro-magnetically operated reversible means for restoring said factor to the predetermined value, of an electron discharge device provided with input and output circuits for controlling said reversible means in one direction, means responsive to said factor for controlling the energization of the input circuit of said device, a transformer, the secondary of said transformer connected in the output circuit of said device and the primary of the transformer connected in the circuit of said electro-magnetic means, and means responsive to said factor for controlling said reversible means in the other direction.

2. Apparatus for indicating the value of a variable comprising, an indicator, a reversing motor having normally energized opposed fields for positioning said indicator, a plurality of electron discharge devices arranged to control the energization of said fields, and means for varying the current transmitted by a selected one of said electron discharge devices upon a change in the magnitude of said variable, the selection determined by the direction of such change.

3. The combination with a plurality of circuits, of a motor having a rotor and a plurality of field windings, each of said windings connected in one of said circuits, a source of alternating current for energizing said circuits, a second plurality of circuits, an electron discharge device in each of said second plurality of circuits, and a transformer inductively coupling each of said first-named plurality of circuits with one of said second-named plurality of circuits.

4. In combination, an electric motor having a plurality of normally energized equal opposed field windings whereby the rotor is not urged to rotation, a plurality of transformers, a source of alternating-current, each field winding connected in series with the primary of a transformer across the source, and a secondary circuit for each transformer including in part an evacuated space traversed by electrons.

5. In combination, an electric motor having a plurality of normally energized equal opposed field windings whereby the rotor is not urged to rotation, a plurality of transformers, a source of alternating-current, each field winding connected in series with the primary of a transformer across the source, a secondary circuit for each transformer including in part an evacuated space traversed by electrons, and means for establishing a flow of pulsating direct-current through each secondary circuit.

6. In combination, an electric motor having a plurality of normally energized equal opposed field windings whereby the rotor is not urged to rotation, a plurality of transformers, a source of alternating-current, each field winding connected in series with the primary of a transformer across the source, a secondary circuit for each transformer including in part an evacuated space traversed by electrons, and means responsive to the instantaneous value of a variable for controlling current flow through the secondary circuits.

7. In combination, an electric motor having a plurality of opposed field windings, a plurality of transformers, a source of alternating current, each field winding connected in series with the primary of a transformer across the source, a secondary circuit for each transformer including in part an evacuated space traversed by electrons, and means for selectively unbalancing said opposed fields through control of said secondary circuits.

8. Apparatus for maintaining the value of a variable, comprising in combination, regulating means for the variable, an electric motor for positioning said regulating means and having a plurality of opposed field windings, a plurality of transformers, a source of alternating-current, each field winding connected in series with the primary of a transformer across the source, a secondary circuit for each transformer including in part an evacuated space traversed by electrons, and means responsive to the instantaneous value of the variable for controlling current flow through the secondary circuits.

9. Apparatus for maintaining the value of a variable, comprising in combination, regulating means for the variable, an electric motor for positioning said regulating means and having a plurality of opposed field windings, a plurality of transformers, a source of alternating-current, each field winding connected in series with the primary of a transformer across the source, a secondary circuit for each transformer including in part an evacuated space traversed by electrons, and means responsive to departure in value of the variable from a predetermined value for controlling current proportionality in the secondary circuits.

10. Apparatus for maintaining the value of a variable, comprising in combination, regulating means for the variable, an electric motor for positioning said regulating means and having a plurality of opposed field windings, a plurality of transformers, a source of alternating-current, each field winding connected in series with the primary of a transformer across the source, a secondary circuit for each transformer including in part an evacuated space traversed by electrons, and means responsive to departure in value of the variable from a predetermined value for controlling speed and direction of motor rotation.

11. Power amplifying and positioning apparatus comprising in combination, means for determining the magnitude of a variable, a first member positioned by said means, electron discharge devices controlled by said first member, a reversing electric motor under the control of said electron discharge devices and having a plurality of opposed field windings which when energized apply to the motor rotor equal opposed balancing torques for normally preventing rotation thereof, and a second member positioned by said motor, said second member also positioning the first member for controlling said electron discharge devices.

JOHN D. RYDER.